(12) United States Patent
Farah

(10) Patent No.: US 11,010,364 B2
(45) Date of Patent: *May 18, 2021

(54) COMPUTER-GENERATED ACCURATE YIELD MAP DATA USING EXPERT FILTERS AND SPATIAL OUTLIER DETECTION

(71) Applicant: THE CLIMATE CORPORATION, San Francisco, CA (US)

(72) Inventor: Marian Farah, San Francisco, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/288,738

(22) Filed: Feb. 28, 2019

(65) Prior Publication Data

US 2019/0243817 A1 Aug. 8, 2019

Related U.S. Application Data

(63) Continuation of application No. 14/883,517, filed on Oct. 14, 2015, now Pat. No. 10,303,677.

(51) Int. Cl.
*G06F 16/00* (2019.01)
*G06F 16/23* (2019.01)
(Continued)

(52) U.S. Cl.
CPC ........ *G06F 16/2358* (2019.01); *G06F 16/248* (2019.01); *G06Q 10/0639* (2013.01); *G06Q 50/02* (2013.01)

(58) Field of Classification Search
CPC .............. G06F 16/2358; G06F 16/248; G06Q 10/0639; G06Q 50/02
See application file for complete search history.

(56) References Cited

U.S. PATENT DOCUMENTS 6,338,221 B1 1/2002 Salmond et al.
6,505,146 B1 * 1/2003 Blackmer ............ A01B 79/005
340/991

(Continued)

FOREIGN PATENT DOCUMENTS

EP 2 902 984 A1 8/2015

OTHER PUBLICATIONS

European Patent Office, "Search Report" in application No. 20172804.5-1222, dated Jun. 29, 2020, 26 pages.

(Continued)

*Primary Examiner* — Dinku W Gebresenbet
(74) *Attorney, Agent, or Firm* — Hickman Becker Bingham Ledesma LLP; Malgorzata A. Kulczycka

(57) ABSTRACT

A method and system for decontaminating raw yield maps by combining filters with spatial outlier detectors is provided. In an embodiment, the method comprises receiving over a computer network electronic digital data comprising first yield data representing crop yields harvested from an agricultural field; applying one or more filters to the first yield data to identify, from the first yield data, first outlier data; generating first filtered data from the first yield data by removing the first outlier data from the first yield data; identifying, in the first filtered data, second outlier data representing outlier values based on one or more outlier characteristics; generating second outlier data from the first filtered data by removing the second outlier data from the first filtered data; generating and causing displaying on a mobile computing device a graphical representation of the crop yields harvested from the agricultural field using only the second outlier data.

20 Claims, 12 Drawing Sheets

(51) Int. Cl.
*G06F 16/248* (2019.01)
*G06Q 50/02* (2012.01)
*G06Q 10/06* (2012.01)

(56) References Cited

U.S. PATENT DOCUMENTS

| | | | |
|---|---|---|---|
| 6,525,276 | B1 | 2/2003 | Vellidus et al. |
| 2010/0161464 | A1 | 6/2010 | Solotorevsky |
| 2011/0259618 | A1 | 10/2011 | Zielke et al. |
| 2014/0035752 | A1 | 2/2014 | Johnson |
| 2015/0066932 | A1* | 3/2015 | Stuber .................. G06Q 50/02 707/737 |
| 2015/0124054 | A1* | 5/2015 | Darr ..................... G01F 22/00 348/46 |

OTHER PUBLICATIONS

Europan Claims in application No. 20172804.5-1222, dated Jun. 2020, 4 pages.
Brazil Patent Office, "Search Report" in application No. 1120180075345, dated Jul. 14, 2020, 2 pages.
Brazil Claims in application No. 1120180075345, dated Jul. 2020, 8 pages.
European Patent Office, "Search Report" in application No. 16 855 961.5-1222, dated May 17, 2019, 3 pages.
European Claims in application No. 16 855 961.5-1222, dated May 2017.
Canada Property Office, "Search Report" in application No. 3,001,328 dated Jun. 17, 2019, 7 pages.
Canada Claims in application No. 3,001,328, dated Jun. 2019, 7 pages.
The International Bureau of WIPO, "International Preliminary Report on Patentability", in application No. PCT/US2016/055121, dated Apr. 17, 2018, 8 pages.
International Searching Authority, "Search Report" in application No. PCT/US16/55121, dated Dec. 23, 2016, 17 pages.
European Patent Office, "Search Report" in application No. 168559615-1222, dated Feb. 14, 2019, 6 pages.
European Claims in application No. 16855961.5-1222, dated Feb. 2019, 6 pages.
Current Claims in application No. PCT/US2016/055121, dated Dec. 2016, 6 pages.
Current Claims in application No. PCT/US2016/055121, dated Apr. 2018, 6 pages.
Australian Patent Office, "Search Report" in application No. 2016337264, dated Feb. 28, 2019, 5 pages.
Australian Claims in application No. 2016337264, dated Feb. 2019, 6 pages.
Argentina Patent Office, "Office Action" in application No. 20160103126, dated Aug. 27, 2020, 5 pages.
Argentina Claims in application No. 20160103126, dated Aug. 2020, 8 pages.
Farah, U.S. Appl. No. 14/883,517, filed Oct. 14, 2015, Office Action, dated Jul. 13, 2018.
Farah, U.S. Appl. No. 14/883,517, filed Oct. 14, 2015, Notice of Allowance, dated Jan. 14, 2019.
Farah, U.S. Appl. No. 14/883,517, filed Oct. 14, 2015, Interview Summary, dated Oct. 12, 2018.
Australian Patent Office, "Search Report" in application No. 2020201559, dated Dec. 23, 2020, 5 pages.
Australian Patent Office, "Office Action" in application No. 2020201559, dated Jan. 19, 2020, 4 pages.
Australian Claims in application No. 2020201559, dated Jan. 2021, 8 pages.
Australian Claims in application No. 2020201559, dated Dec. 2020, 8 pages.

\* cited by examiner (a)

(b)

US 11,010,364 B2

COMPUTER-GENERATED ACCURATE YIELD MAP DATA USING EXPERT FILTERS AND SPATIAL OUTLIER DETECTION

BENEFIT CLAIM

This application claims the benefit under 35 U.S.C. § 120 as a Continuation of application Ser. No. 14/883,517, filed Oct. 14, 2015, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure generally relates to computer systems useful in agriculture. The disclosure relates more specifically to computer systems that are programmed or configured to generate accurate yield map data by using expert filters and spatial outlier detection approaches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Determining distributions of yield of crops from agricultural fields is essential for planning and evaluating agricultural management strategies. However, raw data representing yield of crops and obtained from field equipment is known to suffer from contamination such as errors. Some of the errors may be due to errors or shortcomings of the mechanisms used in the field to collect data about the yield of crops. For example, some of the data collection sensors on pieces of harvesting or other agricultural equipment may be incorrectly calibrated, and thus introducing some bias in the measured yield. Other errors may be inherent to the harvesting environment and conditions, including operational delays in registering harvested crops, improperly calibrated harvesting equipment including a harvester bar, incorrectly registered speed readings with which a harvester harvests the crops, narrow finishes of the harvesting combine, and errors caused by the harvester's turns and harvesting overlaps.

Decontaminating this data representing yield of crops is usually carried out by persons who visually inspect the data. The persons may be experts trained in applying various filters and thresholds to determine whether the data representing the yields is decontaminated. Based on the visual inspection and analysis of relations between the collected data and the thresholds, the experts may try to determine sources that caused the contamination. Unfortunately, the methods of selecting the filters and thresholds are typically random and unstructured, and thus do not offer a coherent and robust approach for decontaminating the data. Furthermore, it is often difficult to assess the effectiveness of the filters and thresholds with respect to their applicability to data harvested from different fields, using different harvesting equipment, and harvested using different crop harvesting techniques.

SUMMARY OF THE DISCLOSURE

The appended claims may serve as a summary of the disclosure.

DETAILED DESCRIPTION

Figure 1:
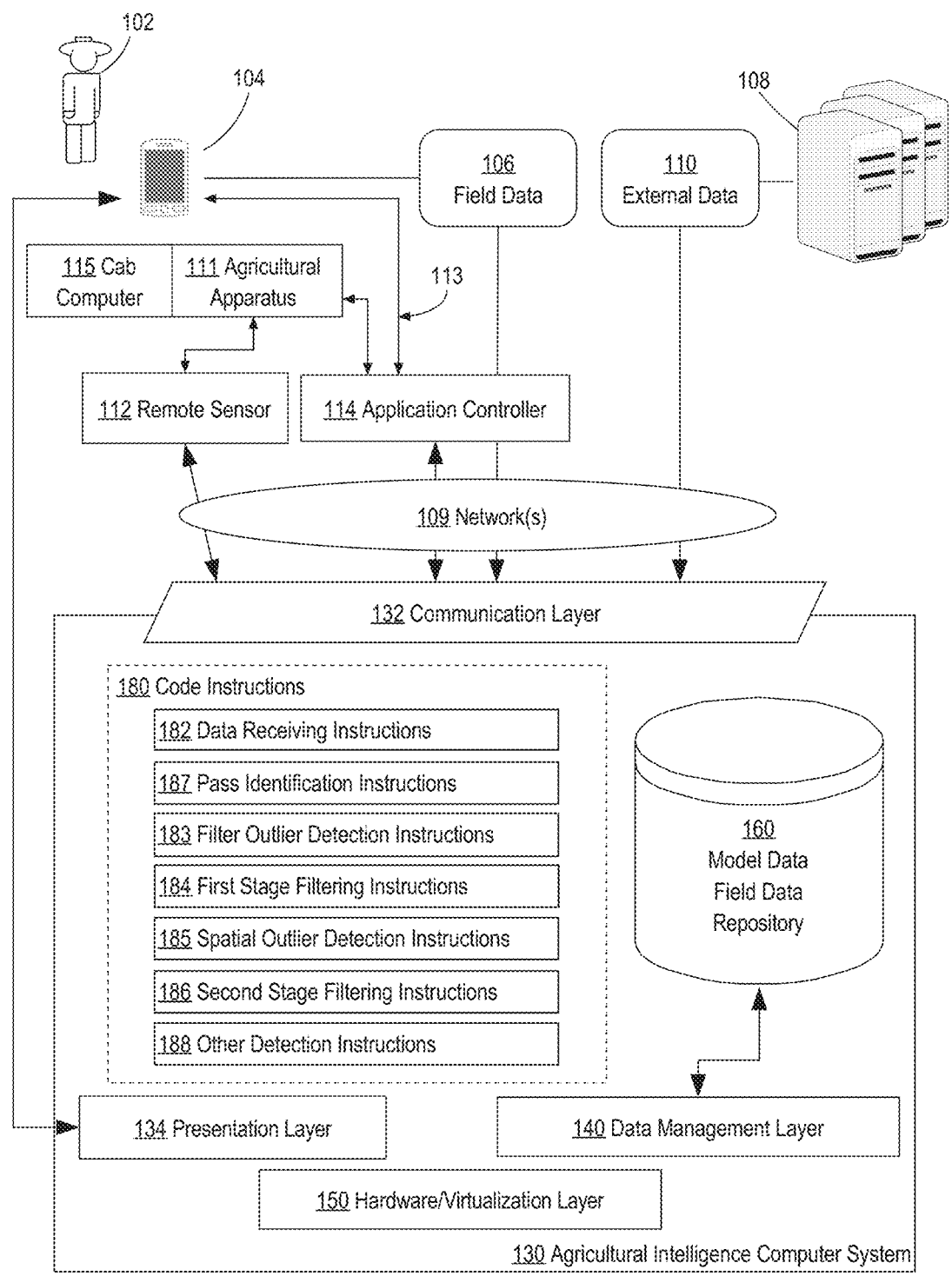
FIG. 1 illustrates an example computer system that is configured to perform the functions described herein, shown in a field environment with other apparatus with which the system may interoperate.

Embodiments are disclosed in sections according to the following outline:
1. GENERAL OVERVIEW
2. EXAMPLE AGRICULTURAL INTELLIGENCE COMPUTER SYSTEM
  2.1. STRUCTURAL OVERVIEW
  2.2. APPLICATION PROGRAM OVERVIEW
  2.3. DATA INGEST TO THE COMPUTER SYSTEM 2.4. PROCESS OVERVIEW—AGRONOMIC MODEL TRAINING
2.5. IMPLEMENTATION EXAMPLE—HARDWARE OVERVIEW
3. COLLECTING MEASUREMENT DATA
4. NON-UNIFORM DISTRIBUTION OF RAW YIELD DATA
5. EXAMPLE SOURCES OF CONTAMINATION
6. GENERATING DECONTAMINATED YIELD MAP DATA USING EXPERT FILTERS AND SPATIAL OUTLIER DETECTORS
7. FILTERING EXAMPLES
7.1. PASS IDENTIFICATION FILTER
7.2. SHORT PASS FILTER
7.3. FLOW LAG FILTER
7.4. ABRUPT SPEED CHANGE FILTER
7.5. START PASS DELAY FILTER
7.6. END PASS DELAY FILTER
7.7. SHORT SWATH FILTER
8. SPATIAL OUTLIER DETECTION EXAMPLES
8.1. AVERAGE MEAN VALUE TEST
8.2. WEIGHTED AVERAGE MEAN VALUE TEST
9. BENEFITS OF CERTAIN EMBODIMENTS
10. EXTENSIONS AND ALTERNATIVES 1. General Overview Aspects of the disclosure generally relate to computer-implemented techniques for decontaminating data representing yield of crops harvested from agricultural fields, and based on data that has been collected using sensors affixed to agricultural apparatus in the field. Contaminated data may include data that is considered incorrect or potentially incorrect for any of several reasons. Such data may include, for example, data that has been captured by malfunctioning sensors or data that was incorrectly captured by misaligned harvesting apparatus or other agricultural apparatus. For example, contaminated data may include data that has been incorrectly registered due to improperly calibrated sensors installed in combines in the field. Contaminated data may also include data containing errors introduced by an unresolved width of the harvester bar of the harvesting combine, varying harvester speed with which the combine harvests the crops, narrow finishes of the harvesting passes, and turns and overlaps of combines or other equipment.

In an embodiment, a data correction or decontamination process may include one or more stages or phases. During each stage, data of a certain type or having certain characteristics is removed. For example, one stage may be directed to filtering out data that appears to be incorrect because it contains errors introduced by malfunctioning sensors installed in a combine. Another stage may be directed to removing data that appears to be incorrect because it contains errors introduced by turns of the combine.

In an embodiment, a process of decontaminating data representing yield of crops starts with receiving electronic digital data representing crop yields that were harvested from one or more agricultural fields, and originally collected in the field using sensors attached to agricultural equipment. The electronic data is also referred herein as first yield data and may be received from a variety of sources, such as computer databases, data repositories, directly from the sensors and/or agricultural equipment, or any other data storages configured to store the information about the crops.

One stage of the process may use a filter-based approach that includes applying one or more software-implemented filters to the received first yield data. The filters may be applied to the first yield data to identify the data items that may contain errors. Outlier data may be flagged or filtered out from the first yield data to produce filtered first data, which may be further processed by another stage.

Sometimes outlier data is not removed from the yield dataset, but instead, is flagged as potentially containing errors that may be subjected to additional processing. The additional processing may be performed using other types of data processing, using different filters or using another stage of the data decontamination process.

In an embodiment, another stage utilizes spatial analysis of the data using a spatial outlier detection. The spatial outlier detection stage may be executed after the previously described filter-based stage has ended. However, this stage may also be executed prior to the filter-based stage, or may be executed as an independent stage unrelated to any other stages.

The spatial outlier detection stage may involve executing computationally complex data analysis and computationally intensive processing of the analyzed data, including but not limited to identifying and determining spatial relationships between data items within groups of data items, or determining a relative impact that some data items in a group have on each other or on other data items in the group, and the like.

Due to the computational complexity of the spatial outlier detection stage, executing that stage on large data sets may be time consuming and resource demanding. Therefore, it is often cost and time effective to execute the filter-based stage on the first yield dataset, which is usually large, and then execute the spatial outlier detection stage on the output of the filter-based stage, which is usually smaller than the raw first yield dataset. Executing the spatial outlier detection stage after the filter-based stage typically is more efficient than the converse.

Executing the spatial outlier stage may include identifying, in the first filtered dataset, second outlier data that contain one or more outlier values that appear to be incorrect. The second outlier data items are either flagged or removed from the first filtered dataset.

A data item may be identified as a second outlier data item if the data item contains one or more outlier characteristics. Such characteristics may include spatial characteristics of the data items in a group of neighboring data items, weight-based characteristics of the data items in a group of neighboring data items, and the like.

In an embodiment, executing a spatial outlier stage involves determining, for a particular data item from a filtered first dataset, a group of neighboring first filtered data, computing an aggregated mean value based on the data items within the group, and comparing the aggregated mean value to a threshold value or a threshold range to determine whether the particular data item contains, or may contain, errors.

A threshold range may indicate an acceptable range of values for aggregated mean values. If an aggregated mean value does not fall within the threshold range, then the particular first filtered data item is either flagged or excluded from the first filtered dataset. Flagging or excluding a particular data item means that the particular data item represents yield crop value that is incorrect, or most likely is incorrect.

A process of determining second outlier data may be repeated for each and every individual first filtered data item, groups of first filtered data items and groups of groups of first filtered data items.

Second outlier data may also be determined based on weighted spatial characteristics of data. This approach includes performing the steps similar to those performed in the approach described above except that instead of computing an aggregated mean value, a weighted aggregated mean value is computed. In this approach, a set of neighboring first filtered data is determined for a particular first filtered data item in the first filtered data. Then, for each item in the set of filtered data, a weight value is determined, and the weighted aggregated mean value is computed and used to determine whether the particular first filtered data item is to be excluded from the first filtered data.

Weight values may represent different characteristics and criteria, and may be determined in a variety of ways. For example, the weight values may be determined based on distance-related characteristics of the items in a group. For example, the weight values may be reversely proportional to a distance between one data item and a particular first filtered data item. The data item values and the respective weights are used to compute a weighted aggregated mean value, and the weighted aggregated mean value is used to determine whether the particular first filtered data item is to be excluded from the first filtered data.

The weight values may also be determined based on time-related-characteristics of data items. For example, the data items in a group of items collected within the same time interval as a particular data item may have higher weight values than the data items in the group that were collected in other time intervals. Using this approach, the weighted aggregated mean value is influenced primarily by the data items that were collected within the same time interval as the particular data item, and not so much by the other data items in the group.

Weights may also be determined based on location-based-characteristics of data items. In this approach, weight values for the data items in a group of items are determined based on proximity of the fields from which the yield data was collected. For example, if a particular data item was collected from a particular field that is adjacent to a first field, but not adjacent to a second field, then a weight associated with a first data item collected from the first field will be higher than a weight associated with a second data item collected from the second field. Using this approach, the weighted aggregate mean value will be influenced primarily by the data items that were collected from the field locations adjacent to the particular field, and less by the data values collected from other data fields.

Execution of a spatial outlier detection stage of the data decontamination process may conclude with determining one or more second outlier data items that contain, or potentially contain, errors. The second outlier data items may be either flagged as containing errors or flagged as potentially containing errors.

Flagging data items as containing errors may involve associating a flag indicator with the data items or otherwise marking the data items as recommended for further processing.

Instead of assigning flags to data items identified as containing errors, the data items may be removed from a first filtered dataset. For example, once one or more second outlier data items are identified, second stage filtering instructions implemented in the computer system may be executed to generate a second filtered dataset from the first filtered data by removing the second outlier data from the first filtered dataset.

Data items that are determined to contain no errors, or potentially contain no errors, may be provided to a user and displayed for example, in a graphical user interface. A graphical representation of the data items may be generated using a presentation layer of the computer system. The graphical representation of the data items may be displayed in the user interface of a mobile device, a computer laptop, a tablet, and the like.

Data items that have been flagged as potentially containing errors may also be displayed. A graphical representation of the data items that have been flagged as potentially containing errors may be graphically distinct from the representation of the data items that are determined to contain no errors. For example, these data items may be displayed in a separate grouping, using separate headings, using a different color coding, and the like.

The ability to display graphical representations of the data items that do not contain errors, graphical representations of the data items that do contain errors and/or graphical representations of the data that are flagged as potentially containing errors provides valuable insight about the yield of crops harvested from agricultural fields. For example, either graphical representation may provide important information about the yields harvested from different fields, using different machinery, or using different harvesting method.

The graphical representations may be displayed on a graphical display of any portable device, and thus the information may be easily accessible to users located in a field. For example, a user may display the information on a tablet or a smart phone as a harvesting combine harvests the crops. This may allow the user to receive an almost real-time summary of the harvested crops.

Since the information may be generated and displayed almost contemporaneously with harvesting of the crops, the user may make decisions as the harvest is collected. For example, based on the displayed information, the user may recommend adjusting a harvesting mechanism, adjusting the sensors installed in a harvesting combine, and the like, to improve the amounts of the harvested crops. Furthermore, based on the displayed information, the user may provide instructions to an operator of the combine to adjust the harvesting passes, and the like.

2. Example Agricultural Intelligence Computer System 2.1. Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source), (f) pesticide data (for example, pesticide, herbicide, fungicide, other substance or mixture of substances intended for use as a plant regulator, defoliant, or desiccant), (g) irrigation data (for example, application date, amount, source), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is an example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106. In an embodiment, agricultural intelligence computer system 130 is programmed with or comprises code instructions 180. Code instructions 180 may include one or more set of programming code instructions. For example, code instructions 180 may include data receiving instructions 182 which, when executed by one or more processors, cause the processors to perform receiving, over a computer network, electronic digital data representing first yield data comprising crop yields harvested from an agricultural field. Code instructions 180 may also include pass identification instructions 187 which, when executed, cause identifying a plurality of pass identifiers and a plurality of global positioning system times in the first yield data; filter outlier detection instructions 183 which, when executed by the processors, cause applying one or more filters to the first yield data to identify, from the first yield data, first outlier data. Furthermore, code instructions 180 may include first stage filtering instructions 184 which, when executed by the processors, cause generating first filtered data from the first yield data by removing the first outlier data from the first yield data; spatial outlier detection instructions 185 which, when executed, cause identifying, in the first filtered data, second outlier data representing outlier values based on one or more outlier characteristics; second stage filtering instructions 186 which, when executed, cause generating second outlier data from the first filtered data by removing the second outlier data from the first filtered data; and any other detection instructions 188.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user 102 may be prompted via one or more user interfaces on the user device (served by the agricultural intelligence computer system) to input such information. In an example embodiment, the user 102 may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user 102 may specify identification data by accessing field identification data (provided as shape files or in a similar format) from the U. S. Department of Agriculture Farm Service Agency or other source via the user device and providing such field identification data to the agricultural intelligence computer system.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
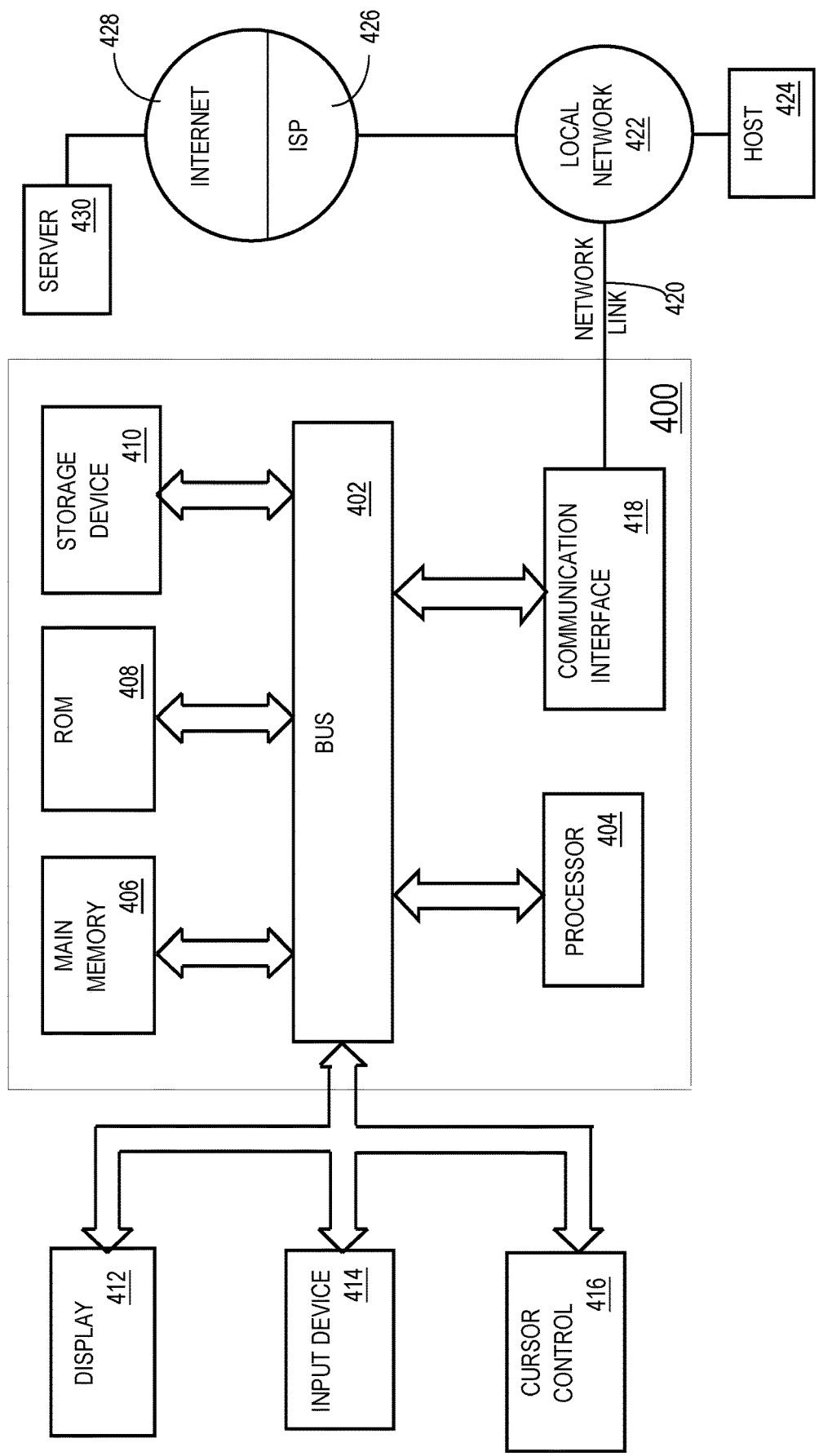
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system 130 independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network 109 to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
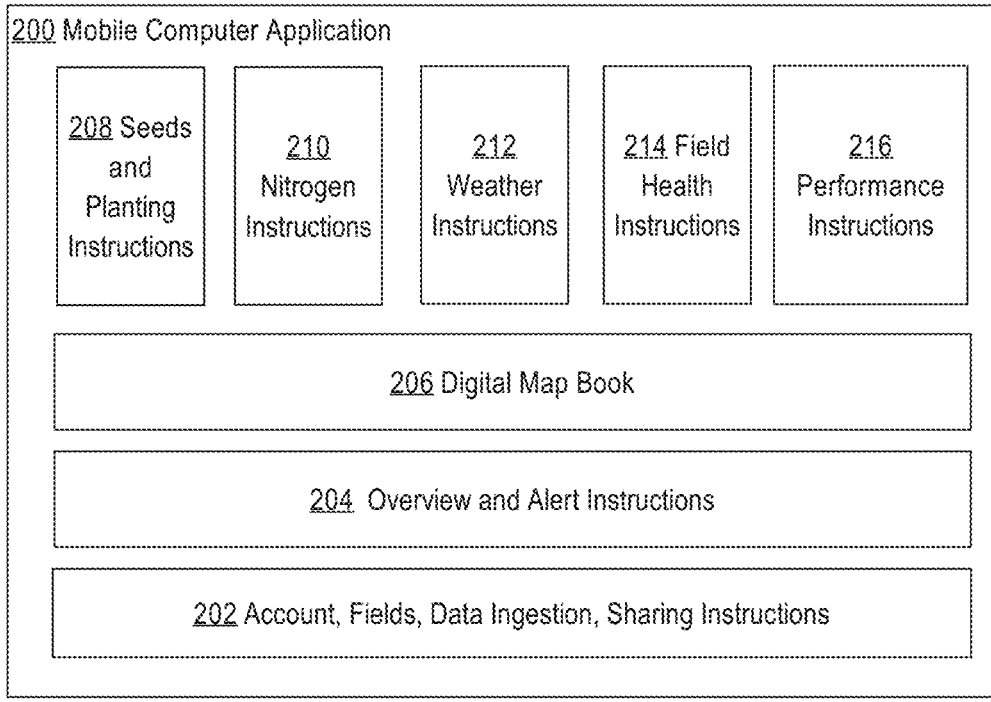
FIG. 2 illustrates two views of an example logical organization of sets of instructions in main memory when an example mobile application is loaded for execution.
Figure 2:
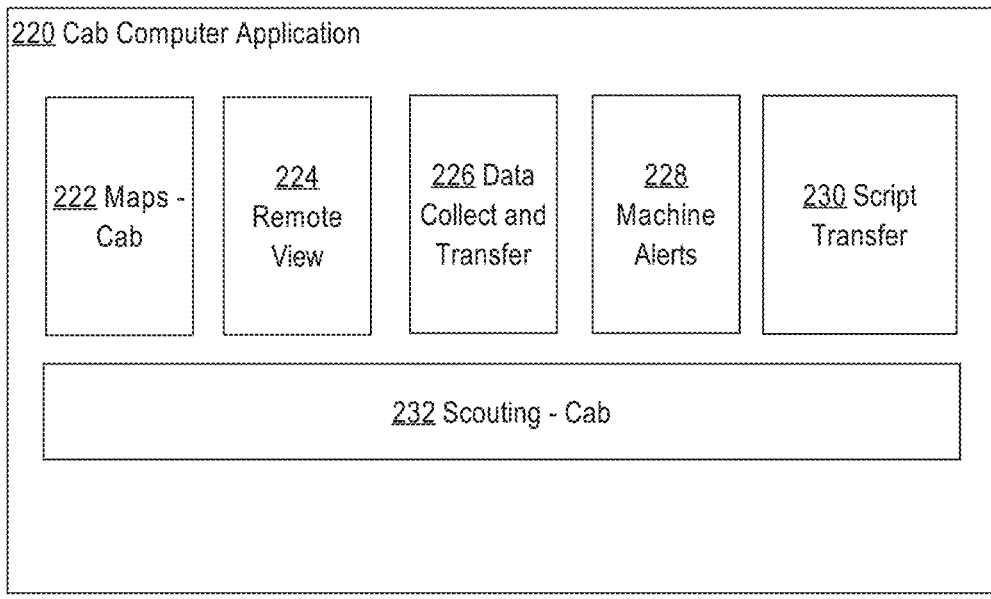

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprising account-fields-data ingestion-sharing instructions 202 are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, external APIs that push data to the mobile application, or instructions that call APIs of external systems to pull data into the mobile application.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 and programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, nitrogen instructions 210 are programmed to provide tools to inform nitrogen decisions by visualizing the availability of nitrogen to crops and to create variable rate (VR) fertility scripts. This enables growers to maximize yield or return on investment through optimized nitrogen application during the season. Example programmed functions include displaying images such as SSURGO images to enable drawing of application zones; upload of existing grower-defined zones; providing an application graph to enable tuning nitrogen applications across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of manure application that were used. Nitrogen instructions 210 also may be programmed to generate and cause displaying a nitrogen graph, once a program is applied to a field, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the NITROGEN ADVISOR, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and U.S. Pat. Pub. 2015/0094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, fertilizer sprayers, or irrigation systems, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
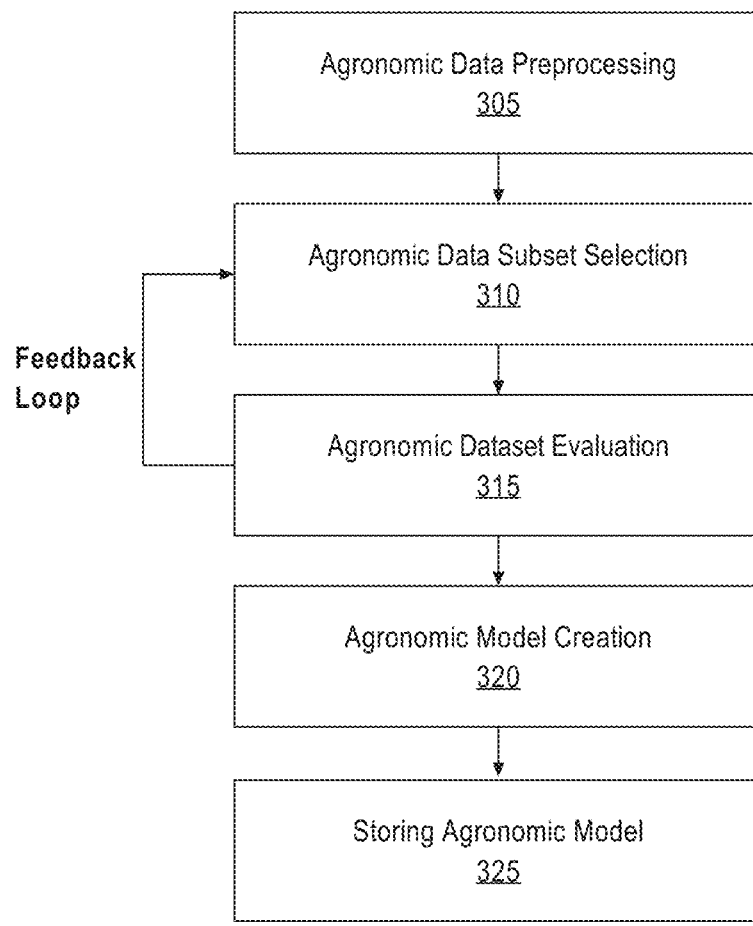
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more external data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more external data resources. The field data received from one or more external data resources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs. Various embodiments of these techniques include, but are not limited to, those described herein.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Collecting Measurement Data

Collecting information about yields of crops harvested from agricultural fields usually involves collecting large amounts of measurement data items. The collected datasets may be especially large if the fields are large and the information is collected frequently and during long time periods. For example, if measurements of data representing the harvested yields are recorded in one or two second intervals as a harvesting combine harvests crops from thousands of acres of fields, then the collected dataset may include a large count of data items. But even if the crops are harvested from small agricultural fields over short time intervals, collecting the yield measurements may cause generating large datasets, which in some cases may include tens to hundreds of thousands of data items.

4. Non-Uniform Distribution of Raw Yield Data

Empirical data shows that histograms derived from data representing yield measurements are not normally distributed. Often the raw yield distributions are non-normal, and sometimes they may be negatively skewed, for example, along low-yielding tails. In some situations, the raw distributions of yields may be negatively skewed resembling right-truncated normal distribution, such as a predominately negative skew and a kurtosis value close to zero. In other situations, some yield data distribution indicates negative skew property. Some of the reasons for the non-normal distribution of the raw yield data include inaccuracies of the measurement equipment installed in a harvesting combine. Once the data containing errors is eliminated, the histograms derived from the decontaminated data most likely lose their non-normal distribution property. For example, there may be some spatial variability in the field or a farmer may grow strips of different hybrids on the same filed. In at least those two cases, the corresponding histograms may not have a normal distribution.

5. Sources of Contamination

Outlier contamination in raw yield maps can be attributed to a number of irregularities occurring as the crop is harvested. Some of the irregularities include time delays caused by the harvesting dynamics as well as harvesting conditions. For example, measurements of the yields may also be contaminated when the sensors and measuring apparatus are incorrectly calibrated. To register correctly the amounts of the harvested crop, the data collecting apparatus installed on a combine harvester needs to be correctly tuned and set. For example, to collect accurate data, equipment operators need to calibrate a harvester logging interval, a logging distance, registration of beginning and end of passes, etc. if the settings are recorded erroneously, then the collected data about the harvested yield may be incorrect.

The measurements may also be contaminated because of the delay between the moment when the crop is actually cut and the moment when the grain is actually measured by a sensor installed in a combine harvester. The delay may be measured as a flow lag, and may correspond to a time difference between the time when the crop is cut and the time when the grain reaches a mass flow sensor mounted on the top of the harvester. The error may result in shifting the measurements in such a way that the measurement indicates the location of the current grain mass flow that does not correspond to the actual location from which the grain flow was collected. For example, by the time the flow sensor detects the particular mass flow, a GPS location of the combine harvester may change and the delay measured often in seconds may not correspond to the GPS readings.

Data representing the yield of the harvested crops may also be contaminated due to a delay introduced by a grain transporter of a combine harvester. This is often referred to as a harvester flow mode delay or a start pass delay. The start pass delay may be measured as a delay between a start of the pass indicated by a GPS sensor and the moment when a grain transporter fills at the start of a harvest pass. There also may be a harvester flow mode delay, also referred to as an end pass delay. The end pass delay may be measured as a delay between the moment when a GPS sensor indicated an end of the harvest pass and the moment when a grain transporter is emptied at the end of the harvest pass.

Furthermore, measurements of yield of the harvested crops may be contaminated because of abrupt changes in the speed with which a combine harvester traverses a field. The abrupt changes in the speed may result in obtaining unrealistic yield measurements. Depending on how abrupt the changes in the speed are, the measurements may be either too high or too low. If the combine harvester abruptly accelerates, then the yield measurements may appear to be erroneously low. However, if the combine harvester abruptly slows down, then the yield measurements may be erroneously high.

Measurements of the yields may also be contaminated when they are collected at the time when a combine harvester makes sharp turns. Also, the measurements may be contaminated at the time when a combine harvester changes a bar segment (swath) lengths, which may happen when the harvester makes sharp turns. The measurements may also be contaminated when accurate GPS information is not available or cannot be associated with the measurements. Lack of accurate GPS information can result in a yield map that is either shifted over the entire field, which is referred to as a systematic error, or is shifted to some incorrect location, which is referred to as a localized error. A systematic error may affect the entire dataset of measurement, and may be identified visually since the resulting yield map will not be aligned with the actual boundaries of the field. A localized error may affect a small number of measurements, such as the measurements identified as collected from the same location in the field.

Data contamination may also be caused by local circumstances surrounding the harvesting process. The circumstances may include dry, humid or dusty conditions present during the harvest that may unduly affect measurements of the grain moisture. Since the calculated yield depends on the grain moisture, erroneous moisture measurements may lead to erroneous yield measurements. For example, dry conditions may cause low grain moisture, and thus the measurements collected in the dry conditions may be lower than the actual yields of crop. On the other hand, humid conditions may cause high grain moisture, and thus the measurements collected in the humid conditions may be higher than the actual yields.

6. Generating Decontaminated Yield Map Data Using Expert Filters and Spatial Outlier Detectors In an embodiment, presented computer-implemented techniques are directed to an approach for decontaminating data representing yields of crops harvested from agricultural fields. The process may include one or more stages, and each stage may be directed to filtering out the decontaminated data of a certain type or having certain characteristics. For example, while one stage may be directed to filtering out contaminated data that might have been collected by malfunctioning sensors installed in combine harvesters, another stage may be directed to removing the data that appears to be duplicate, and the like.

Figure 5:
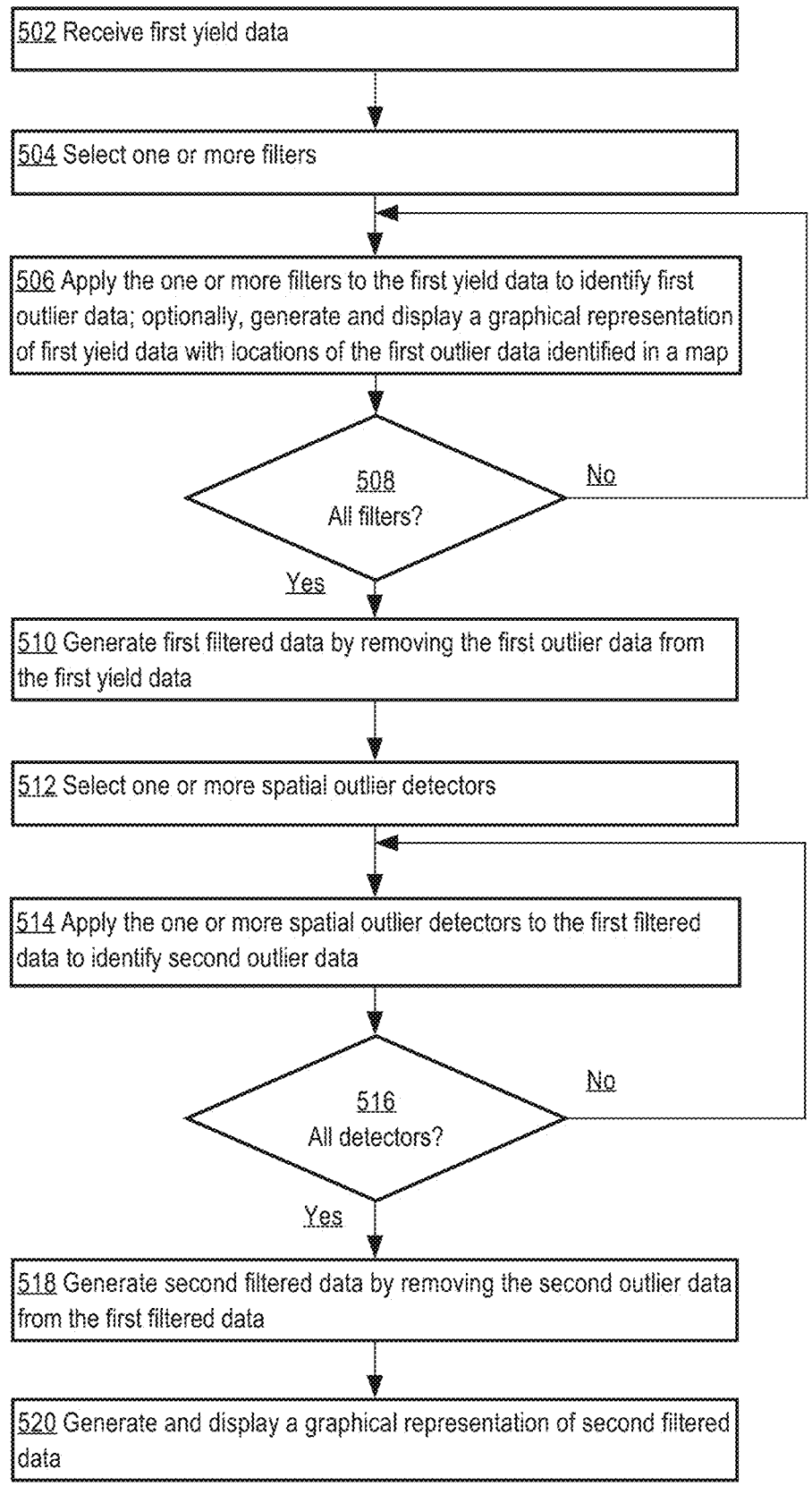
FIG. 5 is a flow diagram that depicts an example method or algorithm for decontaminating data of yield of crops by combining expert filters with spatial outlier detectors.

FIG. 5 is a flow diagram that depicts an example method or algorithm for decontaminating data of yield of crops by combining expert filters with spatial outlier detectors. In one embodiment, a process of decontaminating data representing yields of crops starts in step 502, in which electronic digital data representing crop yields harvested from one or more agricultural fields is received. The electronic digital data is also referred herein as first yield data and may be received from a variety of sources. In the context of decontaminating the yield data, the first yield data may be received from computer databases, data repositories, or any other data storages configured to store the information about the crops. The first yield data may be received over one or more computer networks connecting the computer database or the repositories to the computer system configured to implement the data decontamination approach.

In step 504, one or more software-implemented filters are selected to be applied to the received first yield data. Examples of the filters are described in FIG. 6-10.

In step 506, first yield data representing crop yields harvested from agricultural fields is processed using filter outlier detection instructions in the computer system. The processing may include applying one or more selected filters to the first yield data to identify first outlier data in the first yield data. Examples of this type of processing are described in FIG. 6-10. The first outlier data may include data that is considered contaminated. Such data items may then be filtered out from the first yield data. Optionally, a user may choose to generate and display a graphical representation of first yield data with the locations of the first outlier data identified on a yield map.

Contaminated data may include the data that is considered erroneous or potentially erroneous. Such data may include the data that has been captured by malfunctioning sensors or the data incorrectly captured by misaligned gear used to harvests yield of crops from agricultural fields. For example, the contaminated data may include the data that has been incorrectly registered due to improperly calibrated sensors installed in combines harvesting the crops. That data may also include the data containing errors introduced by unresolved harvester bar width of a harvesting combine, varying harvester speed with which a combine harvests the crops, narrow finishes of the harvesting passes, and harvester turns and overlaps. Various sources of data contamination are described in the previous sections.

In step 508, a test is performed to determine whether all filters have been applied to the first yield data. If all filters have been applied to the first yield data, then step 510 is performed. Otherwise, another filter is selected, and the newly selected filter is applied to the first yield data in step 506.

In step 510, first filtered data is generated from the first yield data. The contaminated data is called first outlier data. The first outlier data includes one or more items from the first yield the data that includes incorrect data, or the data that is potentially incorrect. In step 510, the first outlier data items are removed from the first yield dataset. The resulting subset of the first yield data contains the data items referred to as first filtered data, or a first filtered dataset. The first filtered dataset may be subjected to further processing and analysis.

In an embodiment, first outlier data is not removed from the first yield data, but instead, is flagged as potentially containing errors. Flagging a data item may include assigning a flag or an indicator to the data item to indicate that the item potentially contains contaminated information.

First filtered data may be either provided to a user, or may require additional processing. The additional processing may be performed using different approaches, using different filters or using another stage of the data decontamination process described below.

In step 512, a spatial outlier detection stage of the process of data decontamination is executed. In this step, one or more spatial outlier detectors are selected. Various types of the spatial outlier detectors are described in FIG. 11 and FIG. 12.

In step 514, a spatial outlier detection process is executed on the first filtered data. Executing the spatial outlier detection process may involve executing, on the first filtered data, spatial outlier detection instructions implemented in the computer system. This type of processing may include identifying, in the first filtered data, second outlier data representing one or more outlier values that are determined to be incorrect, or potentially incorrect. Examples of this type of processing are described in FIG. 11 and FIG. 12.

In step 516, a test is performed to determine whether all spatial outlier detectors have been applied to the first filtered data to identify second outlier data. If all filters have been applied to the first yield data, then step 518 is performed.

Otherwise, another spatial outlier detector is selected, and the newly selected spatial outlier detector is applied to the first filtered data in step 514.

In step 518, second outlier data is generated. A data item may be identified as a second outlier data item if the data item contains one or more outlier characteristics. Such characteristics may include spatial characteristics of the data items in a group of neighboring data items, weight-based characteristics of the data items in a group of neighboring data items, and the like.

Outlier characteristics are usually determined for a group of data items. The process of determining the outlier characteristics may be implemented in a variety of ways, and the implementation of the process is not limited to any particular approach. One way of implementing the process of determining the outlier characteristics involves determining a group of neighboring data sets, determining an average mean value for the group, and based on the aggregated mean value, determining if a particular data item within the group contains an erroneous data. A particular implementation of the process may involve determining, for a particular data item from the filtered first data items, a group of neighboring first filtered data, computing an aggregated mean value for the data items within the group of the neighboring first filtered data, and comparing the aggregated mean value with a threshold value or a threshold range to determine whether the particular data item contains an error. A threshold range may indicate an acceptable range of values for the first filtered data. If the aggregated mean value does not fall within the threshold range, then the particular first filtered data item may be included in a second outlier dataset, and subsequently flagged or excluded from the first filtered data.

A particular data item is flagged or excluded from the first filtered dataset if the particular data item represents yield crop value that is most likely erroneous. For example, if the particular data item represents a yield crop value that is too far from the average mean value computed for the neighboring data items, then the particular data item most likely includes inaccurate yield crop data. Such a data items may be used to generate a second outlier data.

The process of determining second outlier data may be repeated for each and every individual first filtered data items, groups of first filtered data items and groups of groups of first filtered data items. The process may also be repeated only for the data items that have been flagged by the filter-based stage as potentially containing errors.

In step 520, a graphical representation of second filtered data is generated and displayed for a user.

Data items that are determined to contain no errors, or potentially contain no errors, may be provided to a user, and presented to the user in a graphical representation in a graphical user interface. The graphical representation of the data items may be generated using a presentation layer of the computer system. The same presentation layer, or a similar layer, may cause displaying the graphical representation of the data items on a user device, such as a mobile device, a computer laptop, a tablet, and the like.

In an embodiment, in addition to, or instead of providing the data items determined to contain no errors, or potentially containing no errors, the system may provide to the user the data items that have been flagged as containing errors or potentially containing errors. These data items may be graphically represented in a form that distinguishes those items from the data items that are determined to contain no errors. For example, these data items may be displayed in a separate grouping, with separate headings, and the like.

7. Filtering

In an embodiment, a filtering stage of the process of decontaminating data representing yield of crops utilizes a filter-based approach of applying one or more filters to first yield data. The filters are applied to identify the data items that contain, or may contain, errors. The data items that contain errors or may contain errors are referred to as first outlier data and may be flagged or filtered out from the first yield dataset. The resulting data items are referred to as filtered first data, and include the data items that are free of the errors detected using the filter-based approach. Any one or more of the filters described in the following sections may be used, alone or in any combination of two or more filters, in various embodiments. Thus, the enumeration and description of a plurality of filters in the following sections does not require that all embodiments use all the filters.

7.1. Pass Identification Filter

In the context of crop harvesting, a pass is a harvesting cycle during which crop is harvested by a combine harvester. The crop may be harvested using for example, a one-pass method, or a two-pass method. In a one-pass method, biomass and round wood or saw logs are harvested and are recovered simultaneously. In a two-pass method, harvesting and recovery of round wood and biomass material are performed in separate passes. Typically, each pass is identified by a pass identifier, and information about pass identifiers is included in measurement data.

Records about the harvesting passes are usually accurate, and therefore information about the beginning and end of each pass is usually available. However, in some situations, the information about the passes may be unavailable or may be incorrectly recorded.

A pass identification filter allows identify instances when pass identifiers are incorrectly recorded or are missing. The approach relies on two key quantities: (1) the GPS times recorded between consecutive observations, and (2) the calculated angles between the current observation, the preceding observation, and the following observation.

In an embodiment, the approach identifies a set of observations according to the time order in which the observations were recorded, and checks: (1) whether the time between the current observation and the following observation is greater than the median logging interval, and (2) whether the angle between the preceding observation, the current observation and the following observation is significantly smaller than 7. If both conditions are satisfied, then the current observation is deemed the start of a new pass. A logging interval is the time between two consecutive measurements. Typically, a logging interval is set at the beginning of harvest. For example, a logging interval may be set to a 1 second interval, or a 2 second interval, and the like.

Figure 6:
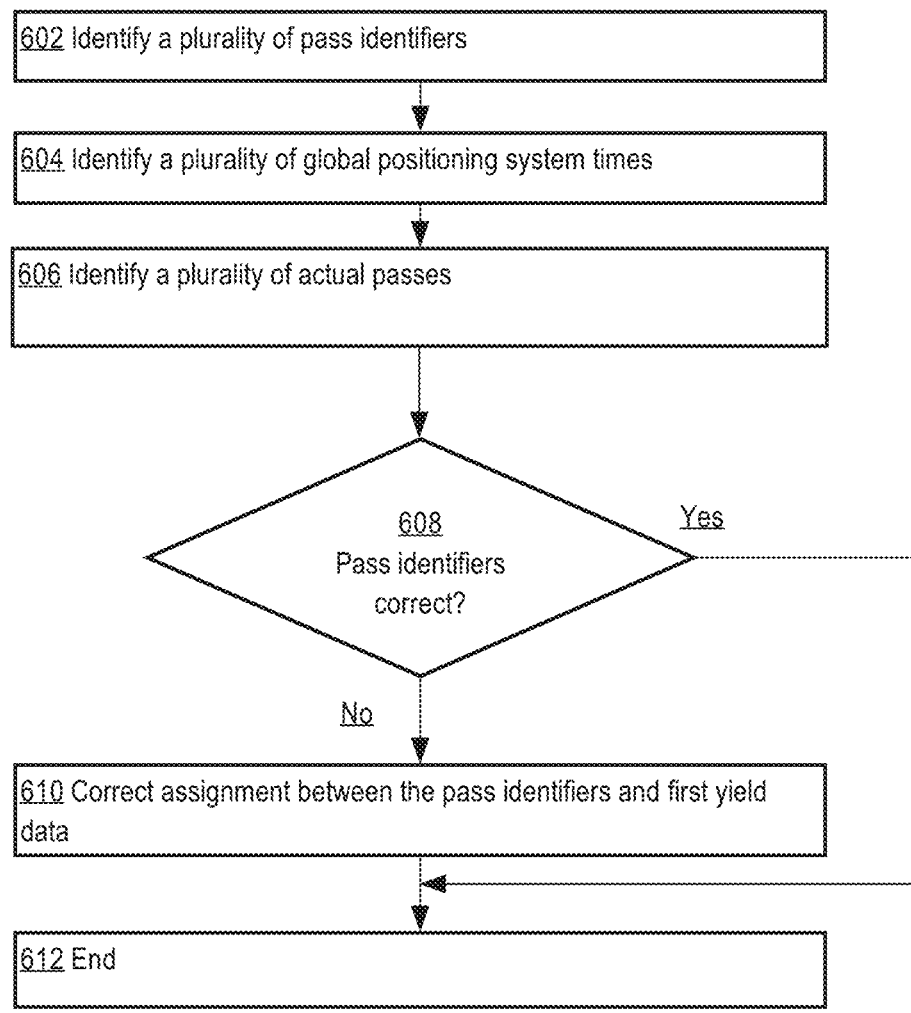
FIG. 6 is a flow diagram that depicts an example method or algorithm for performing a pass identification test on data of yield of crops.

FIG. 6 is a flow diagram that depicts an example method or algorithm for performing a pass identification test on data of yield of crops.

In step 602, a plurality of pass identifiers associated with the first yield data is identified. A plurality of pass identifiers identifies actual passes during which the first yield data has been recorded as a combine harvester traversed the agricultural field.

In step 604, a plurality of global positioning system (GPS) times in the first yield data is identified. A GPS time from the plurality of GPS times identifies an actual time period elapsing between recording two consecutive first yield data values.

In step 606, based at least in part on the plurality of GPS times, a plurality of actual passes for which the first yield data has been recorded as a combine harvester traversed the agricultural field is identified.

In step 608, based at least in part on the plurality of pass identifiers and the plurality of actual passes, a determination is made whether the plurality of pass identifiers is incorrectly assigned to the first yield data. If the determination is positive, then in step 610, a manner in which the plurality of pass identifiers is assigned to the first yield data is corrected.

In step 612, the process of performing a pass identification test of first yield data stops. At this point, the assignment of the pass identifiers to the first yield data is corrected.

7.2. Short Pass Filter

In an embodiment, a short pass filter is designed to identify first yield data that appears to correspond to unusually short passes. Short passes, also referred to as short segments, are known to produce unreliable yield measurements, and thus the measurements corresponding to the short passes are usually flagged or eliminated from the first yield data.

Flagging or eliminating measurements associated with short passes may include setting a lower bound on the number of observations expected in a pass, and determining the time period during which a combine harvester spends being idle or being outside of a steady flow state. The delays are usually 10 to 40 seconds long, and thus the lower bound is typically set to the number of observations recorded within the 10 to 40 second long intervals. For example, if the measurements are recorded every second, then the passes that contain less than 30 observations may be considered too short to be free of contamination.

Figure 7:
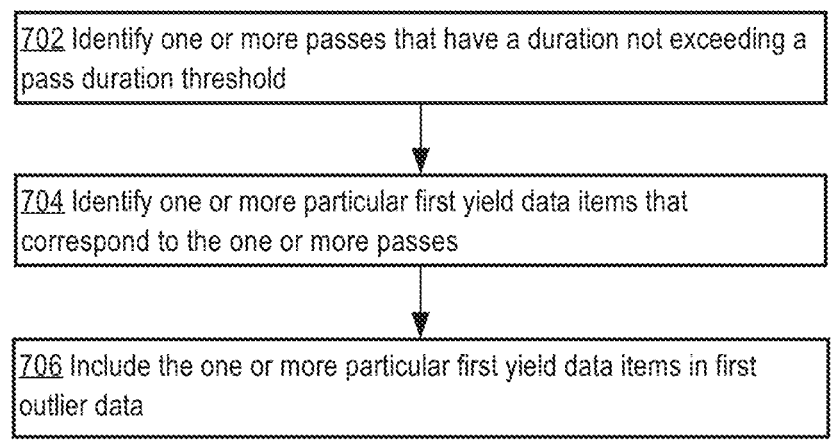
FIG. 7 is a flow diagram that depicts an example method or algorithm for performing a short pass filter test on data of yield of crops.

FIG. 7 is a flow diagram that depicts an example method or algorithm for performing a short pass filter test on data of yield of crops.

In step 702, one or more passes from a plurality of actual passes that have a duration not exceeding a pass duration threshold are identified. These passes may be considered as too short to be free of contamination.

In step 704, one or more particular first yield data items from the first yield data that correspond to the one or more passes are identified. These first yield data items may correspond to the passes that have been identified as too short to be free of contamination.

In step 706, the one or more particular first yield data items in the first outlier data are included. The items included in the first outlier data are the items that have been identified as too short to be free of contamination. These items may be flagged as contaminated data or may be excluded from the first yield data.

7.3. Flow Lag Filter

A flow lag corresponds to the time from the moment when the crop is cut by a combine harvester to the moment when the crop grain reaches the mass flow sensor mounted on the top of the harvester. The flow lag is an error and results in shifting the crop measurements in such a way that the current grain mass flow measurement does not correspond to the GPS location recorded by the sensor for the current grain measurement. When a flow lag is present, the current grain mass flow measurement may be associated with the GPS location of a subsequent measurements recorded a few seconds after the current grain mass was actually collected.

Estimating a flow lag may be performed by a visual inspection of the first yield data. In some situations, the measurements of the yield crop may be shifted by a specified amount, and then visually inspected by the user. The visual inspection may allow determining whether the shifting resulted in improving the alignment of the passes, and thus at least partially lessened the "zipping effect" of the measurements.

The shifts may be selected manually or automatically using a computer. Different shifts may be investigated, and one of them may be selected to perform an alignment of the passes and correct the flow lag.

7.4. Abrupt Speed Change Filter

Abrupt changes in a speed with which a combine harvester is harvesting crops may result in unrealistic yield measurements. Depending on the speed, the measurements may be too high or too low. For example, if the speed is too fast, then the yield measurements may be erroneously too low. By corollary, if the speed is too low, then the yield measurements may be erroneously too high.

An abrupt speed change filter may be designed to calculate a speed at each observation using the GPS times recorded by a sensor, and to compute distances between each two consecutive observations. The observations with the calculated speeds that are greater than, for example, 7 mph, and the observations with the calculated speeds that are smaller than, for example, 2 mph, may be identified as contaminated, and thus flagged or removed from the first yield data. furthermore, the observations for which the calculated speed changes by, for example, 20% from the previous observed location may be identified as contaminated, and thus flagged or removed from the first yield data.

7.5. Start Pass Delay Filter

A start pass delay, also referred to as a harvester fill mode delay, is a time delay during which a grain transporter fills at the start of a harvest pass. The start pass delay may be a few minutes long. A start pass delay starts when a pass starts and ends when a combine harvester reaches a steady state. Measurements collected during the start pass delay may be flagged as contaminated or may be removed from the first yield data as contaminated.

In an embodiment, a start pass delay filter operates on each pass and removes the first few observations that fall within a start delay time. A start pass delay may be determined based on data indicating sufficiently long passes and by observing how long it takes for the mass flow (normalized by a speed with which a combine harvester is moving) to reach a steady state. For example, if the first 15 observations appear to be collected as a combine harvester reaches a steady state, then the yield data from the 15 observations may be used to compute an average value, and may be used to determine a start pass delay.

Figure 8:
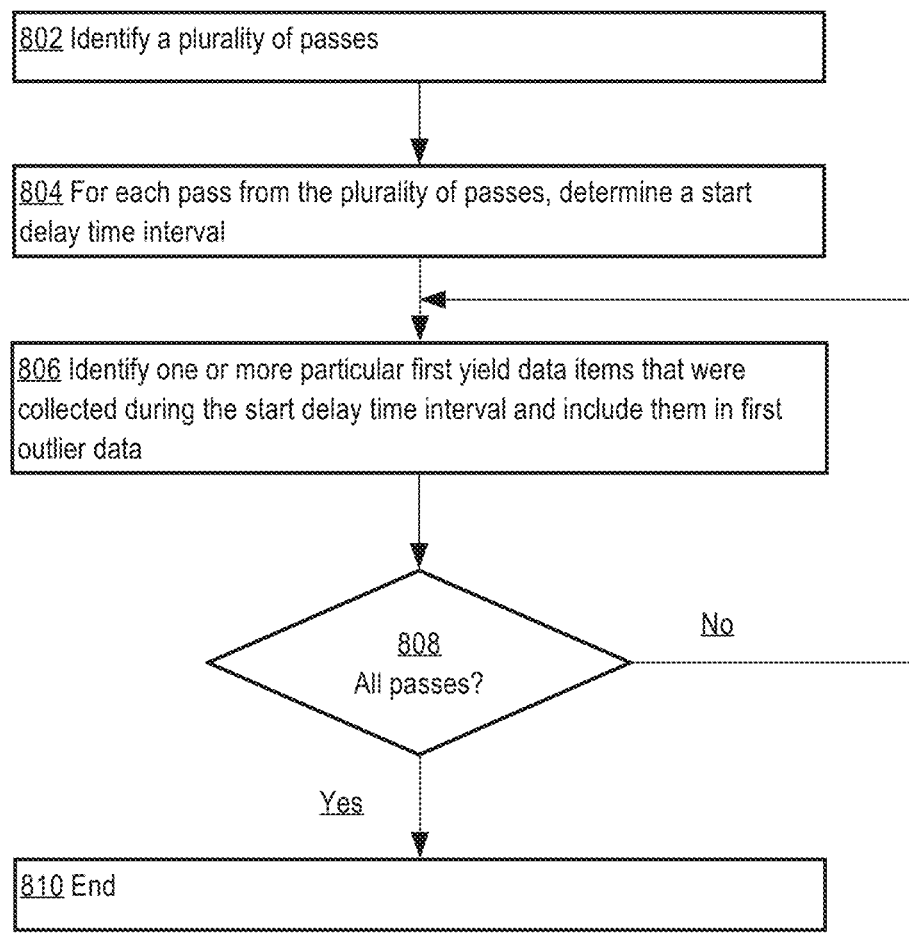
FIG. 8 is a flow diagram that depicts an example method or algorithm for performing a start pass delay filter test on data of yield of crops.

FIG. 8 is a flow diagram that depicts an example method or algorithm for performing a start pass delay filter test on data of yield of crops.

In step 802, a plurality of passes is identified.

In step 804, for each pass from the plurality of actual passes, a start delay time interval for the combine harvester to reach a steady state of crop harvesting is determined.

In step 806, one or more particular first yield data items from the first yield data that were collected during the start delay time interval are identified and included in the first outlier data.

In step 808, a test is performed whether all passes have been checked. If not, then another pass is checked in step 806.

In step 810, the first outlier data items are flagged as contaminated data or may be excluded from the first yield data. The first outlier data includes the items that have been identified as collected during a short pass delay.

7.6. End Pass Delay Filter

An end pass delay, also referred to as a harvester finish mode delay, is a time delay during which a grain transporter is being emptied at the end of a harvest pass. An end pass delay may be determined by visual inspection of the collected yield data, or by applying computer-implemented filters.

In an embodiment, an end pass delay filter operates on each pass and causes removing the last few observations that fall within an end delay time. This approach is essentially a backward implementation of a start pass delay filter. While the start pass delay filter removes the first few observations that fall within a start delay time, the end pass delay filter removes the last few observations that fall within the end delay time.

An end pass delay filter may determine when the mass flow (normalized by a speed with which a combine harvester moves) leaves a steady state. From that point in time until the end of the pass corresponds to an end time delay. The first yield data items that were collected during that period of time may be identified as contaminated and thus flagged or removed from the first yield dataset.

Figure 9:
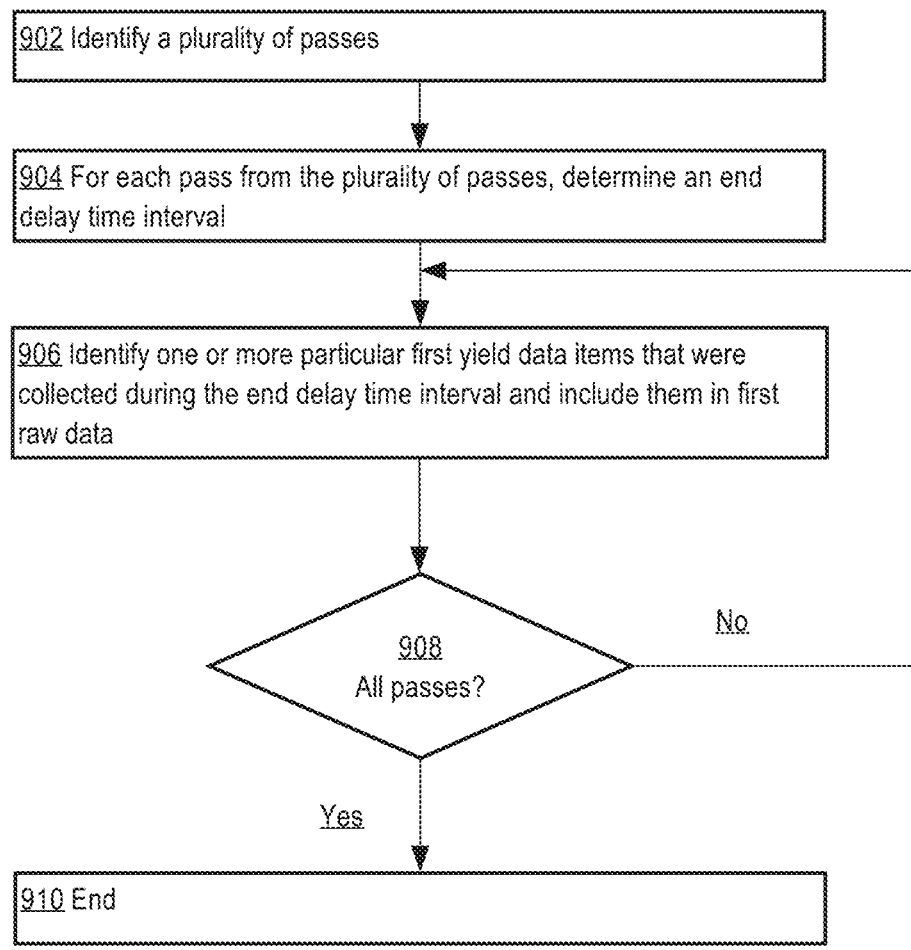
FIG. 9 is a flow diagram that depicts an example method or algorithm for performing an end pass delay filter test on data of yield of crops.

FIG. 9 is a flow diagram that depicts an example method or algorithm for performing an end pass delay filter test on data of yield of crops.

In step 902, a plurality of passes is identified.

In step 904, for each pass from the plurality of actual passes, an end delay time interval for the combine harvester to leave a steady state of crop harvesting is identified.

In step 906, one or more particular first yield data items is identified in the first yield data that were collected during the end delay time interval and included in the first outlier data.

In step 908, a test is performed whether all passes have been checked. If not, then another pass is checked in step 906.

In step 910, the first outlier data items are flagged as contaminated data or may be excluded from the first yield data. The first outlier data includes the items that have been identified as collected during an end pass delay.

7.7. Short Swath Filter

A swath if a bar segment length determined for a harvesting component of a combine harvester. The length of the bar segment may change as the combine turns. Short swath measurements may cause narrow finishes and overlaps, and the yield measurements collected at those times may be contaminated.

A short swath filter may be designed to check the recorded swath for each observation. If the recorded swath is below a full bar width, then the associated yield measurements may be considered as contaminated.

Figure 10:
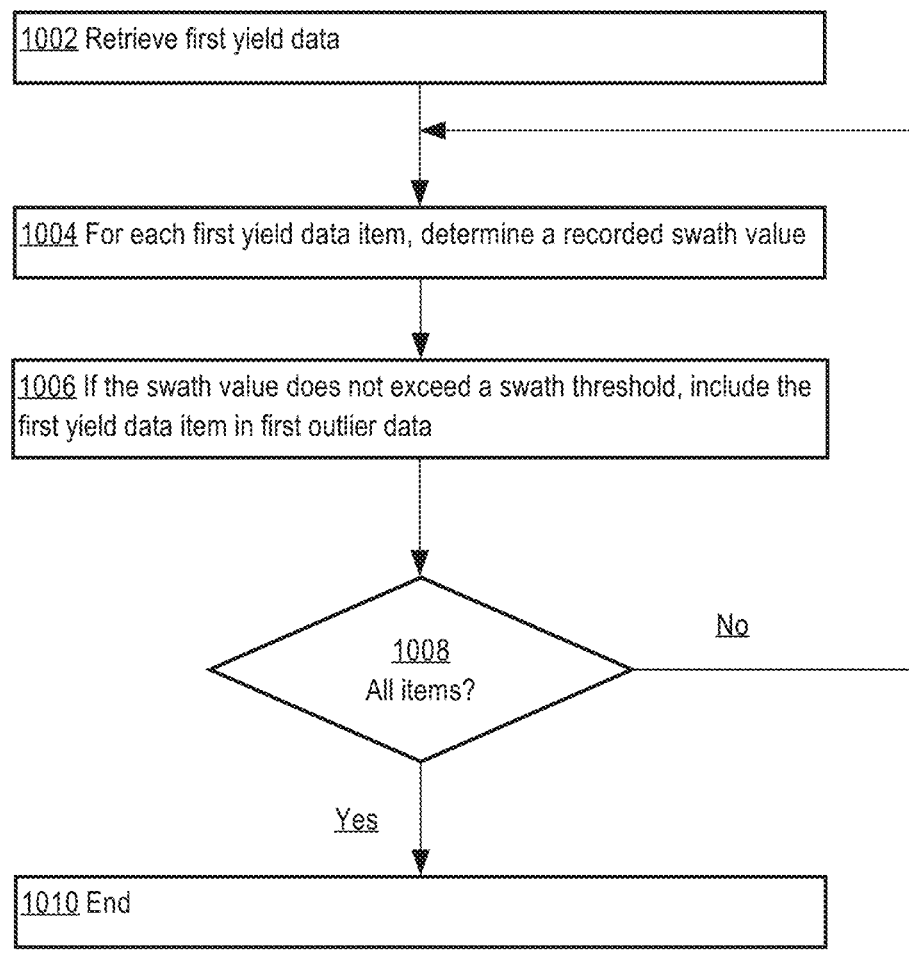
FIG. 10 is a flow diagram that depicts an example method or algorithm for performing a short swath filter test on data of yield of crops.

FIG. 10 is a flow diagram that depicts an example method or algorithm for performing a short swath filter test on data of yield of crops.

In step 1002, first yield data is retrieved.

In step 1004, for each first yield data item from the first yield data, a recorded swath value is determined.

In step 1006, it is determined whether the recorded swath value does not exceed a swath threshold. If the recorded swath value does not exceed a swath threshold, then the first yield data item is included in the first outlier data.

In step 1008, a test is performed whether all first yield data items have been checked. If not, then another first yield data item is checked in step 1006.

In step 1010, the first outlier data items are flagged as contaminated data or may be excluded from the first yield data. The first outlier data includes the items that have been identified as harvested with a short swath, and thus contaminated.

8. Spatial Outlier Detection

A spatial outlier detection stage may be executed after executing a filter-base-stage or prior to the filter-based stage. Alternatively, a spatial outlier detection stage may be executed as an independent stage unrelated to any other stages.

Execution of a spatial outlier detection stage of the data decontamination process includes determining one or more data items that contain, or potentially contain, errors. The one or more data items may be ever flagged as containing, or potentially containing, errors, or simply removed from the data set. Flagging the one or more data items as containing, or potentially containing, errors may involve associating a flag indicator to the data items or otherwise marking the data items as recommended for further processing.

A spatial outlier detection may include applying one or more spatial outlier detectors to the first filtered data or to any type of data provided to the detectors. The detectors compute scores for the first filtered data items and the data items with extreme scores are flagged as outliers. The data items with extreme scores may be referred to as second filtered data items or S-outliers.

A spatial outlier detector usually computes an aggregate function for each measurement by computing the aggregate function of the k nearest neighbors of the measurement. The aggregate function may be computed as a mean value of the k nearest neighbors or a weighted mean value of the k nearest neighbors. The aggregate function may also be computed as a median value, or any other method that allows capturing spatial auto-correlation between the measurements within the neighborhood. The spatial auto-correlation between the measurements within the neighborhood may be determined in a time-space, in a location-space, and based on any type of characteristics of the measurements.

Figure 11:
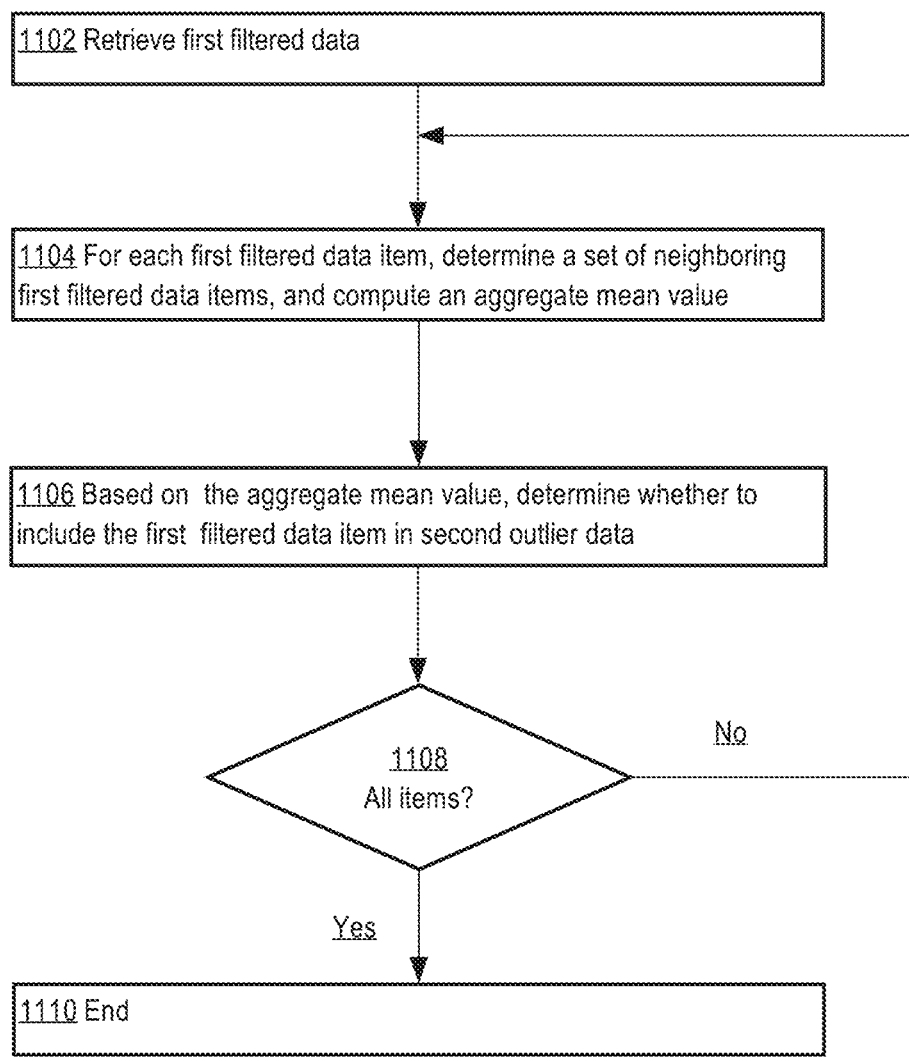
FIG. 11 is a flow diagram that depicts an example method or algorithm for performing a spatial outlier detection based on an aggregate mean value computed from data items.

FIG. 11 is a flow diagram that depicts an example method or algorithm for performing a spatial outlier detection based on an aggregate mean value computed from data items.

In step 1102, first filtered data is retrieved.

In step 1104, one or more spatial outlier detectors are applied to the first filtered data to determine, for each first filtered data item from the first filtered data, a set of neighboring first filtered data items that were collected either shortly before or shortly after the first filtered data item was collected. For the set of neighboring first filtered data items, the respective measurements are retrieved and used to compute an aggregate mean value from the set of neighboring first filtered data items.

In step 1106, based at least in part on the aggregate mean value, a determination is made whether to include the first filtered data item in the second outlier data.

A first filtered data item is include in the second outlier data if the measurement data for the first filtered data item either significantly exceeds the aggregate mean value or is significantly lesser then the aggregate mean value. Such a first filtered data item is considered to be an outlier, and thus most likely containing contaminated information. For example, if an aggregate mean value computed for k neighbors in a set of neighbors determined for a particular first filtered data item is "AMV," and the particular first filtered data item exceeds the AMV by more than a threshold value, than the particular first filtered data item may be consider as an outlier as its value significantly exceeds the mean value computed for the k neighbors.

In step 1108, a test is performed whether all first filtered data items have been checked. If not, then another first filtered data item is checked in step 1106.

In step 1110, the second outlier data items are flagged as contaminated data or may be excluded from the first filtered data. The second outlier data includes the items that have been identified as spatial outliers, and thus contaminated.

8.2. Weighted Average Mean Value Test

A spatial outlier detector may also compute a weighted aggregate function for each measurement by determining respective weigh values and computing the weighted aggregate function of the k nearest neighbors of the measurement. A weighted aggregate function may be computed as a weighted mean value of the k nearest neighbors, and may be used to determine second outlier data.

Second outlier data may be determined based on weighted spatial characteristics. This approach may include computing a weighted mean value. In this approach, a set of neighboring first filtered data may be determined for a particular first filtered data item in the first filtered data. Then, a respective weight value may be determined for each item in the first filtered data. A weight value determined for a data item may be reversely proportional to the distance between the data item and the particular first filtered data item. The data item values and the respective weights are used to compute a weighted aggregated mean value, and the weighted aggregated mean value is used to determine whether the particular first filtered data item is to be excluded from the first filtered data.

The weights may represent different characteristics and criteria. For example, the data items in a group of items that were collected within the same time interval as a particular data item may have higher weight values than the data items in the group that were collected in other time intervals. Since the data items that were collected in the same time interval as the particular data will have associated higher weight values than the weights of other data items within the group, the weighted aggregate mean value will be influenced primarily by the data items that were collected in the same time interval as the particular data, not by the other data items. Therefore, this approach gives a preferential treatment to the clusters of data items collected approximately within the same time interval, and lesser treatment to the other data items within the group of data items.

Other weights may represent a distance-based proximity between data items within a group of data items. For example, the data items in a group of items that were collected from field locations similar to a particular field location from which a particular data item was located may have higher weight values than the data items in the group that were collected from other field locations. Since the data items that were collected from the field locations similar to the particular field location, the weighted aggregate mean value will be influenced primarily by the items that were collected from the field locations similar to the particular field location, and less by the other data values in the group. Therefore, this approach gives a preferential treatment to the clusters of data items collected from the closely neighboring fields, and lesser treatment to the other items within the group of data items.

Figure 12:
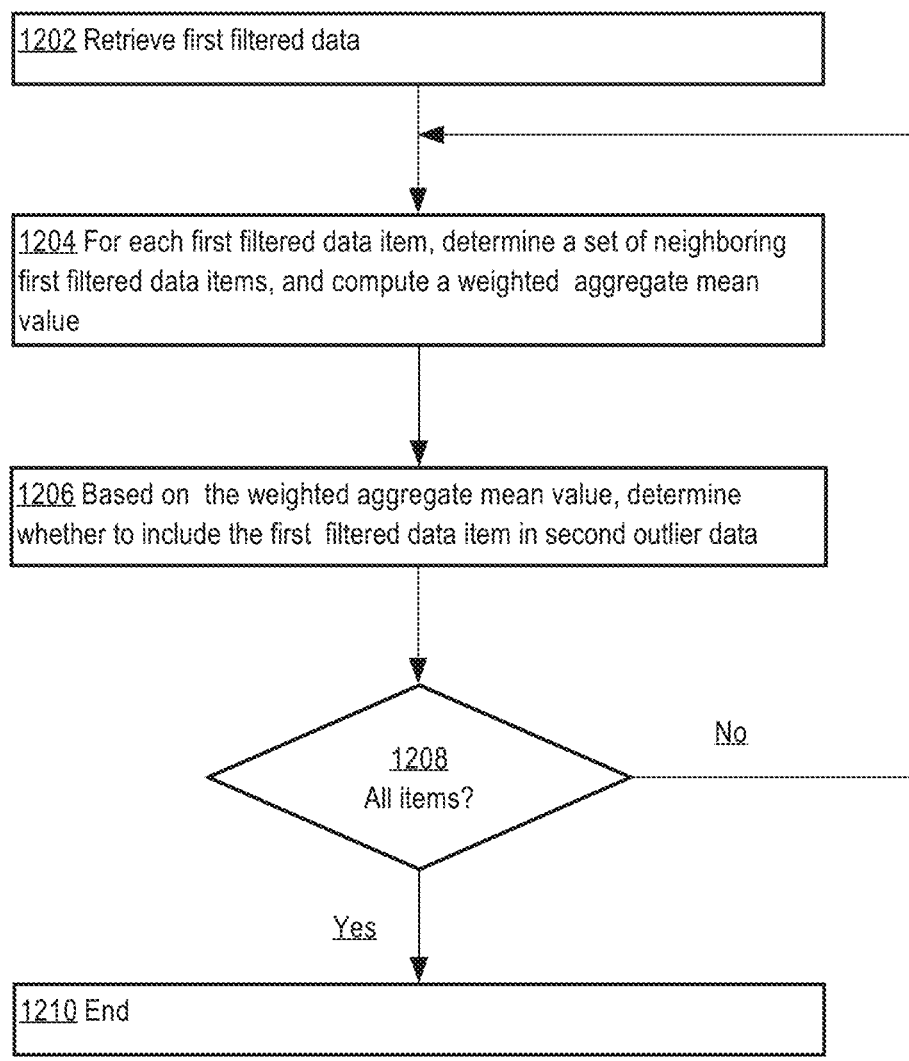
FIG. 12 is a flow diagram that depicts an example method or algorithm for performing a spatial outlier detection based on a weighted aggregate mean value computed from data items.

FIG. 12 is a flow diagram that depicts an example method or algorithm for performing a spatial outlier detection based on a weighted aggregate mean value computed from data items.

In step 1202, first filtered data is retrieved.

In step 1204, one or more spatial outlier detectors are applied to the first filtered data to determine, for each first filtered data item from the first filtered data, a set of neighboring first filtered data items that were collected either shortly before or shortly after the first filtered data item was collected. For the set of neighboring first filtered data items, the respective measurements are retrieved and used to compute a weighted aggregate mean value from the set of neighboring first filtered data items.

In step 1206, based at least in part on the weighted aggregate mean value, a determination is made whether to include the first filtered data item in the second outlier data.

A first filtered data item is include in the second outlier data if the measurement data for the first filtered data item either significantly exceeds the weighted aggregate mean value or is significantly lesser then the weighted aggregate mean value. Such a first filtered data item is considered to be an outlier, and thus most likely containing contaminated information.

In step 1208, a test is performed whether all first filtered data items have been checked. If not, then another first filtered data item is checked in step 1206.

In step 1210, the second outlier data items are flagged as contaminated data or may be excluded from the first filtered data. The second outlier data includes the items that have been identified as spatial outliers, and thus contaminated.

In an embodiment, based on a plurality of aggregate mean values or based on a plurality of weighted aggregate mean values, one or more outlier scores are computed for each first filtered data item from the first filtered data, and based on the outlier scores a determination is made whether to include the first filtered data item in the second outlier data.

In an embodiment, a particular weight value determined for a particular neighbor data is inversely proportional to a time distance value between a time when the first filtered data item was collected and a time when the particular neighbor data item was collected.

9. Benefits of Certain Embodiments

The techniques described herein offer a coherent and robust approach for decontaminating data. In particular, the techniques allow identifying, and disregarding if needed, the crop yield measurements that are contaminated. For example, the approach allows identifying the errors that may be due to shortcomings of the mechanisms used to collect data of the yield of crops, and the errors inherent to the harvesting environment and conditions.

The presented approach also allows displaying graphical representations of the data items that contain no errors, graphical representations of the data items that are flagged as potentially containing errors, or both. The respective displays provide valuable information about the yield of crops harvested from agricultural fields. For example, the information may indicate that decontaminated yield values have been collected, and thus provide a more accurate summary of the harvested yield information than a summary generated from the raw yield data.

Information about decontaminated data may be displayed on a mobile device as a combine harvester harvests the crops, and thus provide an almost real-time summary of the actually harvested crops. If the user notices unusual readings of the decontaminated data, then the user may be able to request that the harvesting mechanism, sensors, and the like be adjusted, or provide instructions to an operator of the combine to adjust the harvesting passes, and the like.

10. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
receiving, from a plurality of sources and via one or more computer networks, first yield data that are expressed in different data formats;
converting, by a converter, the first yield data expressed in the different data formats to converted first yield data expressed in one format;
applying one or more first filters to the converted first yield data to select first outlier data from the converted first yield data;
generating first filtered data from the first yield data by removing the first outlier data from the converted first yield data;
in response to generating the first filtered data, selecting second outlier data from the first filtered data by applying, to the first filtered data, one or more spatial outlier detectors that are different than the one or more first filters;
wherein applying, to the first filtered data, the one or more spatial outlier detectors comprises processing, using the one or more spatial outlier detectors, one or more subsets of the first filtered data for each first filtered data item from the first filtered data;
generating second filtered data from the first filtered data by removing the second outlier data from the first filtered data;
automatically generating a message comprising a graphical representation of the second filtered data;
transmitting the message to one or more users over a computer network in real time, to cause displaying the graphical representation of the second filtered data on their display devices.

2. The method of claim 1, further comprising:
identifying a plurality of pass identifiers and a plurality of global positioning system (GPS) times in the first yield data, wherein the plurality of pass identifiers identifies actual passes during which the first yield data has been recorded as a combine harvester traversed an agricultural field and wherein a GPS time from the plurality of GPS times identifies an actual time period elapsing between recording two consecutive first yield data values;
based at least in part on the plurality of GPS times, identifying a plurality of actual passes for which the first yield data has been recorded as a combine harvester traversed the agricultural field;
based at least in part on the plurality of pass identifiers and the plurality of actual passes, determining whether the plurality of pass identifiers is incorrectly assigned to the first yield data and if so, correcting a manner in which the plurality of pass identifiers is assigned to the first yield data.

3. The method of claim 2, wherein the applying one or more first filters to the first yield data comprises performing:
identifying one or more passes from the plurality of actual passes that have a duration not exceeding a pass duration threshold;
identifying one or more particular first yield data items from the first yield data that correspond to the one or more passes;
including the one or more particular first yield data items in the first outlier data.

4. The method of claim 2, wherein the applying the one or more first filters to the first yield data comprises for each pass from the plurality of actual passes, determining a start delay time interval for the combine harvester to reach a steady state of crop harvesting, identifying one or more particular first yield data items from the first yield data that were collected during the start delay time interval, and including the one or more particular first yield data items in the first outlier data.

5. The method of claim 2, wherein the applying one or more first filters to the first yield data comprises performing, for each pass from the plurality of actual passes, determining an end delay time interval for the combine harvester to leave a steady state of crop harvesting, identifying one or more particular first yield data items from the first yield data that were collected during the end delay time interval, and including the one or more particular first yield data items in the first outlier data.

6. The method of claim 2, wherein the applying one or more first filters to the first yield data comprises performing for each first yield data item from the first yield data, determining a recorded swath value, and if the recorded swath value does not exceed a swath threshold, including the first yield data item in the first outlier data.

7. The method of claim 2, wherein the identifying, in the first filtered data, second outlier data comprises performing for each first filtered data item from the first filtered data, determining a set of neighboring first filtered data items that were collected either shortly before or shortly after the first filtered data item was collected, computing an aggregate mean value from the set of neighboring first filtered data items, and based at least in part on the aggregate mean value determining whether to include the first filtered data item in the second outlier data.

8. The method of claim 7, further comprising based on a plurality of aggregate mean values, computing an outlier score for each first filtered data item from the first filtered data, and based on the outlier score determining whether to include the first filtered data item in the second outlier data.

9. The method of claim 2, wherein the applying one or more spatial outlier detectors to the first filtered data comprises performing for each first filtered data item from the first filtered data, determining a set of neighboring first filtered data items that were collected either a first distance before or a second distance after the first filtered data item was collected, determining a set of weights for the set of neighboring first filtered data items, compute a weighted aggregate mean value from the set of neighboring first filtered data items and the set of weights, and based at least in part on the weighted aggregate mean value determining whether to include the first filtered data item in the second outlier data;
wherein a particular weight value for a particular neighbor data is inversely proportional to a distance value measured between a location at which the first filtered data item was collected and a location at which the particular neighbor data was collected.

10. The method of claim 9, further comprising based on a plurality of weighted aggregate mean values, computing an outlier score for each first filtered data item from the first filtered data, and based on the outlier score determining whether to include the first filtered data item in the second outlier data.

11. A data processing system comprising:
a memory;
one or more processors coupled to the memory and programmed to:
receive, from a plurality of sources and via one or more computer networks, first yield data that are expressed in different data formats;
convert, by a converter, the first yield data expressed in the different data formats to converted first yield data expressed in one data format;
apply one or more first filters to the converted first yield data to select first outlier data from the converted first yield data;
generate first filtered data from the converted first yield data by removing the first outlier data from the converted first yield data;
in response to generating the first filtered data, apply one or more spatial outlier detectors to the first filtered data to select second outlier data from the first filtered data;
wherein the one or more spatial outlier detectors are different than the one or more first filters; wherein applying, to the first filtered data, the one or more spatial outlier detectors comprises processing, using the one or more spatial outlier detectors, one or more subsets of the first filtered data for each first filtered data item from the first filtered data;
generate second filtered data from the first filtered data by removing the second outlier data from the first filtered data;
automatically generate a message comprising a graphical representation of the second filtered data;
transmit the message to one or more users over a computer network in real time, to cause displaying the graphical representation of the second filtered data on their display devices.

12. The data processing system of claim 11, wherein the one or more processors are further programmed to:
identify a plurality of pass identifiers and a plurality of global positioning system (GPS) times in the first yield data, wherein the plurality of pass identifiers identifies actual passes during which the first yield data has been recorded as a combine harvester traversed an agricultural field and wherein a GPS time from the plurality of GPS times identifies an actual time period elapsing between recording two consecutive first yield data values;
based at least in part on the plurality of GPS times, identify a plurality of actual passes for which the first yield data has been recorded as a combine harvester traversed the agricultural field;
based at least in part on the plurality of pass identifiers and the plurality of actual passes, determine whether the plurality of pass identifiers is incorrectly assigned to the first yield data and if so, correcting a manner in which the plurality of pass identifiers is assigned to the first yield data.

13. The data processing system of claim 12, wherein the one or more processors are further programmed to:
identify one or more passes from the plurality of actual passes that have a duration not exceeding a pass duration threshold;
identify one or more particular first yield data items from the first yield data that correspond to the one or more passes;
include the one or more particular first yield data items in the first outlier data.

14. The data processing system of claim 12, wherein the one or more processors are further programmed to:
determine, for each pass from the plurality of actual passes, a start delay time interval for the combine harvester to reach a steady state of crop harvesting, identify one or more particular first yield data items from the first yield data that were collected during the start delay time interval, and include the one or more particular first yield data items in the first outlier data.

15. The data processing system of claim 12, wherein the one or more processors are further programmed to:
determine, for each pass from the plurality of actual passes, an end delay time interval for the combine harvester to leave a steady state of crop harvesting, identify one or more particular first yield data items from the first yield data that were collected during the end delay time interval, and include the one or more particular first yield data items in the first outlier data.

16. The data processing system of claim 12, wherein the one or more processors are further programmed to:
determine, for each first yield data item from the first yield data, a recorded swath value, and if the recorded swath value does not exceed a swath threshold, include the first yield data item in the first outlier data.

17. The data processing system of claim 12, wherein the one or more processors are further programmed to:
determine, for each first filtered data item from the first filtered data, a set of neighboring first filtered data items that were collected either shortly before or shortly after the first filtered data item was collected, compute an aggregate mean value from the set of neighboring first filtered data items, and based at least in part on the aggregate mean value determine whether to include the first filtered data item in the second outlier data.

18. The data processing system of claim 17, wherein the one or more processors are further programmed to:
compute an outlier score for each first filtered data item from the first filtered data and based on the outlier score determine whether to include the first filtered data item in the second outlier data.

19. The data processing system of claim 12, wherein the one or more processors are further programmed to:
determine, for each first filtered data item from the first filtered data, a set of neighboring first filtered data items that were collected either a first distance before or a second distance after the first filtered data item was collected, determine a set of weights for the set of neighboring first filtered data items, compute a weighted aggregate mean value from the set of neighboring first filtered data items and the set of weights, and based at least in part on the weighted aggregate mean value determine whether to include the first filtered data item in the second outlier data;
wherein a particular weight value for a particular neighbor data is inversely proportional to a distance value measured between a location at which the first filtered data item was collected and a location at which the particular neighbor data was collected.

20. The data processing system of claim 19, wherein the one or more processors are further programmed to:
  compute, based on a plurality of weighted aggregate mean values, an outlier score for each first filtered data item from the first filtered data, and based on the outlier score determine whether to include the first filtered data item in the second outlier data.

\* \* \* \* \*